United States Patent [19]
Jeon

[11] Patent Number: 5,981,104
[45] Date of Patent: Nov. 9, 1999

[54] CAP ASSEMBLY OF BATTERY

[75] Inventor: Byong-hee Jeon, Suwon, Rep. of Korea

[73] Assignee: Samsung Display Devices Co., Ltd., Kyungki-do, Rep. of Korea

[21] Appl. No.: 08/965,859

[22] Filed: Nov. 7, 1997

[30]     Foreign Application Priority Data

Dec. 31, 1996 [KP] DPR of Korea ...................... 96-80191

[51] Int. Cl.⁶ .............................. H01M 2/04; H01M 2/08
[52] U.S. Cl. ............................ 429/174; 429/175; 429/54
[58] Field of Search ............................... 429/53, 54, 174, 429/175, 185

[56]     References Cited

U.S. PATENT DOCUMENTS 5,759,713  6/1998  DePalma et al. ......................... 429/54
5,888,668  3/1999  Park ........................................ 429/175

Primary Examiner—John S. Maples
Attorney, Agent, or Firm—Leydig, Voit & Mayer, Ltd.

[57]     ABSTRACT

A cap assembly of a battery includes a cap cover in which ventilation holes are formed in the center portion, a cap assembled on the upper edge of the cap cover, and ventilation rubber interposed between the cap cover and the cap for opening and closing the ventilation holes. At least two and preferably two to four ventilation holes are formed in the cap cover. Accordingly, the life span of a battery employing the cap assembly can be greatly enhanced.

8 Claims, 3 Drawing Sheets

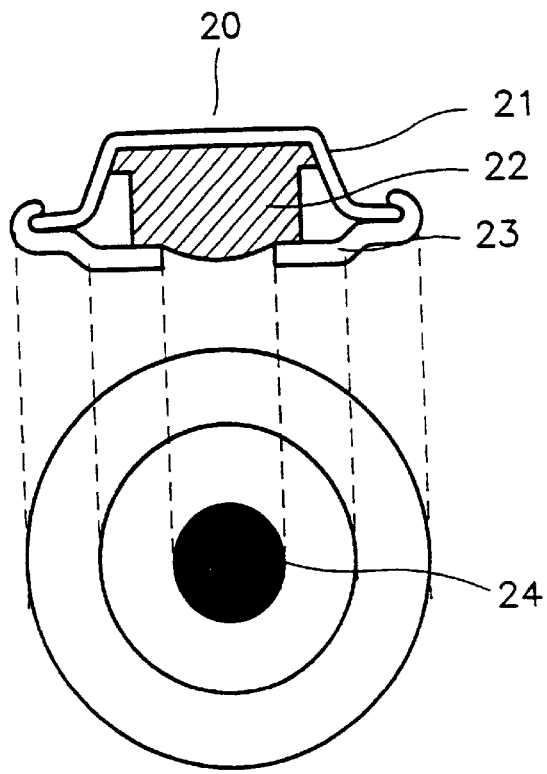
FIG. 2A
FIG. 2B
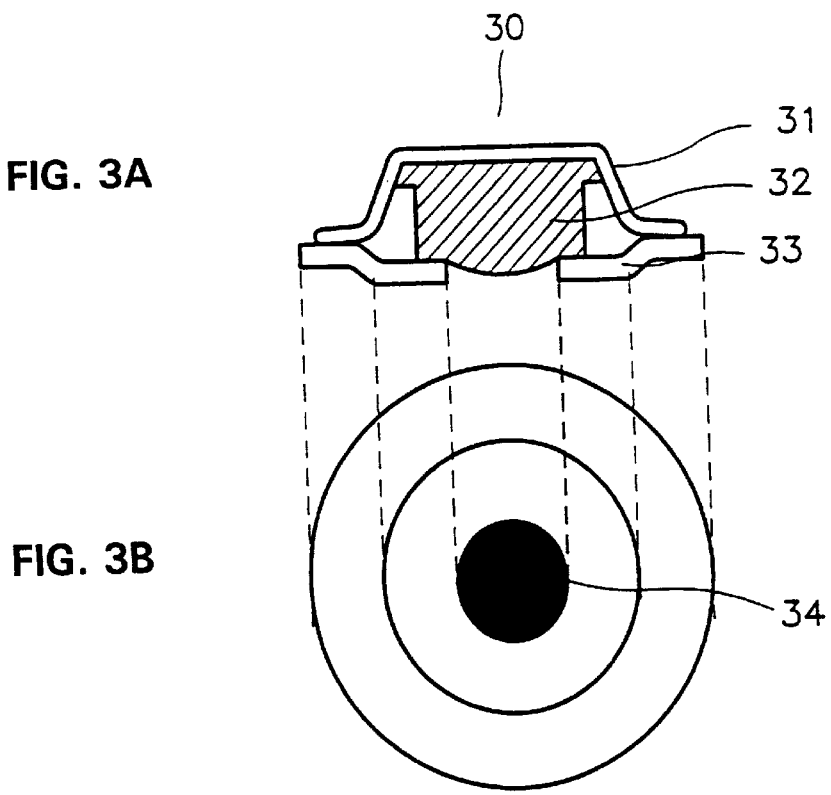
FIG. 3A
FIG. 3B

CAP ASSEMBLY OF BATTERY

BACKGROUND OF THE INVENTION

1. Field of the Invention

The present invention relates to a cap assembly of a battery, and more particularly, to a cap assembly of a battery having ventilation rubber in which pressure applied to the ventilation rubber is dispersed by improving the shape of a cap cover, to maintain restoring force of the ventilation rubber under conditions in which the battery is repeatedly charged and discharged.

2. Description of the Related Art

In general, batteries for supplying direct current voltage are divided into dry cells used for various electric devices, and storage batteries used for automobiles and uninterruptible power systems.

FIG. 1 is a sectional view of the internal structure of a conventional battery.

Referring to FIG. 1, the battery is comprised of a cylindrical case 11 and a roll structure in the case 11. That is, positive plates 12 and negative plates 13 of rectangular thin plates having a predetermined width and length are alternately arranged around a core (not shown) to form the roll structure. A separator 14 located between the positive plate 12 and negative plate 13 insulates the two plates 12 and 13.

Also, upper and lower rings 15 and 16 installed on upper and lower edges of the roll structure fix and support the plates 12 and 13. A gasket 20, and a cap 18 and a cap cover 19 each supported by the gasket 20 are installed on the upper ring 15. Ventilation rubber 17 is interposed between the cap 18 and the cap cover 19.

In the above-described battery, excessive charge generates gas, which causes a rapid increase in the internal pressure of the battery. Here, a cap assembly is for preventing explosion of the case 11 due to the internal pressure increase.

FIGS. 2A and 2B are respectively a vertical cross-sectional view and an end view of a crimped cap assembly, and FIGS. 3A and 3B are respectively a vertical cross-sectional view and an end view of a welded cap assembly.

Referring to FIGS. 2A and 2B, a cap assembly 20 of a battery is comprised of a cap 21, a cap cover 23, and ventilation rubber 22 interposed between the cap 21 and the cap cover 23. The ventilation rubber 22 closes a ventilation hole 24 in the center of the cap cover 23.

Referring to FIGS. 3A and 3B, a mechanism of the cap assembly for preventing an increase in the internal pressure of the battery will be described as follows.

When internal pressure in the case increases beyond a predetermined level due to the gas generated during repeated charges and discharges, pressure is applied toward a ventilation hole 34 in the center of the cap cover 33. Accordingly, ventilation rubber 32 closing the ventilation hole 34 moves upward and departs from the cap cover 33. As a result, the ventilation rubber 32 opens to emit gas outward.

However, during repeated charges and discharges, the ventilation rubber repeatedly contracts and expands, so that its restoring force is deteriorated, which causes gas and electrolyte leakage through a gap between the cap cover and the ventilation rubber, so that the life span of the battery is reduced.

SUMMARY OF THE INVENTION

To solve the above problems, it is an object of the present invention to provide a cap assembly in which pressure applied to the ventilation rubber during repeated charges and discharges is dispersed, to maintain the restoring force of the ventilation rubber.

Accordingly, to achieve the above object, there is provided a cap assembly of a battery comprising a cap cover in which ventilation holes are formed in the center portion, a cap assembled on the upper edge of the cap cover and ventilation rubber interposed between the cap cover and the cap for opening and closing the ventilation holes, in which at least two and preferably two to four ventilation holes are formed in the cap cover.

BRIEF DESCRIPTION OF THE DRAWINGS

The above object and advantages of the present invention will become more apparent by describing in detail a preferred embodiment thereof with reference to the attached drawings in which:

FIGS. 2A and 2B are respectively a vertical cross-sectional view and an end view of a crimped cap assembly of a conventional battery;

FIGS. 3A and 3B are respectively a vertical cross-sectional view and an end view of a welded cap assembly of a conventional battery.

DESCRIPTION OF THE PREFERRED EMBODIMENTS

Figure 1:
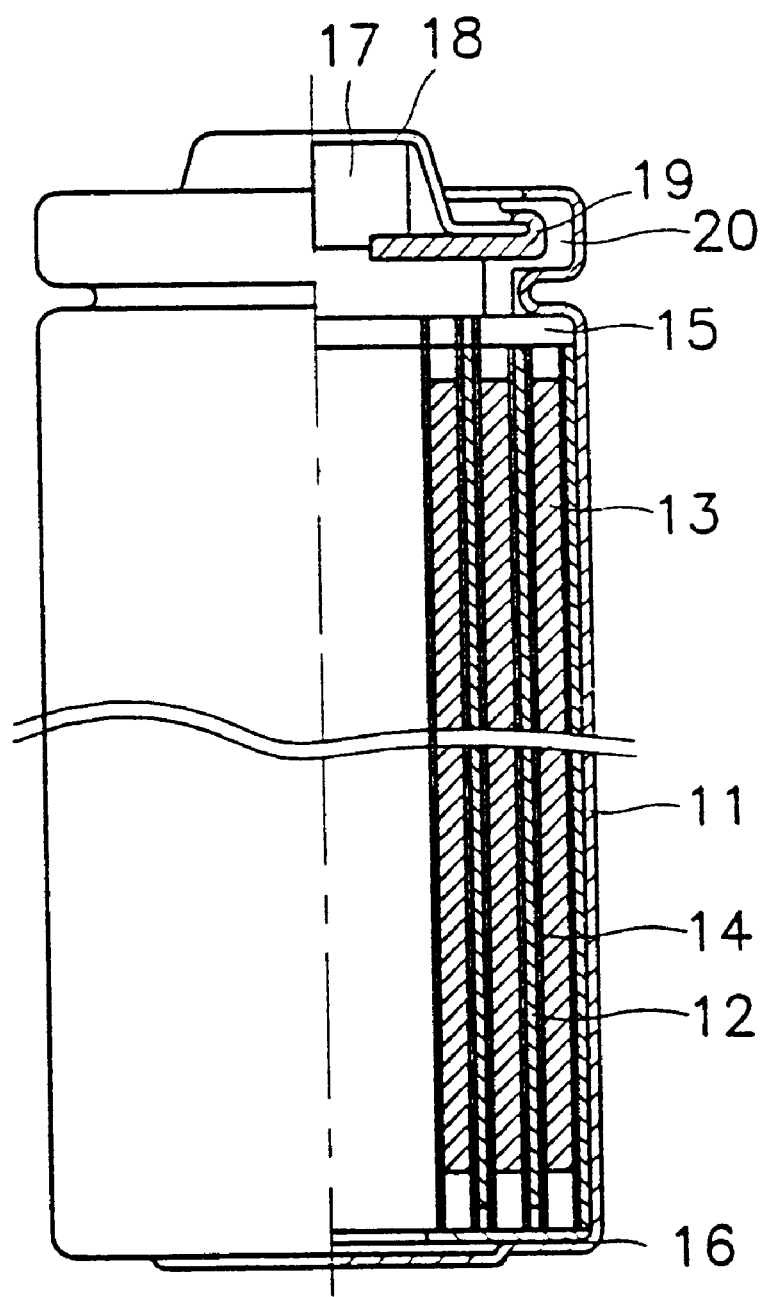
FIG. 1 is a vertical sectional view of the internal structure of a battery.
Figure 4A:
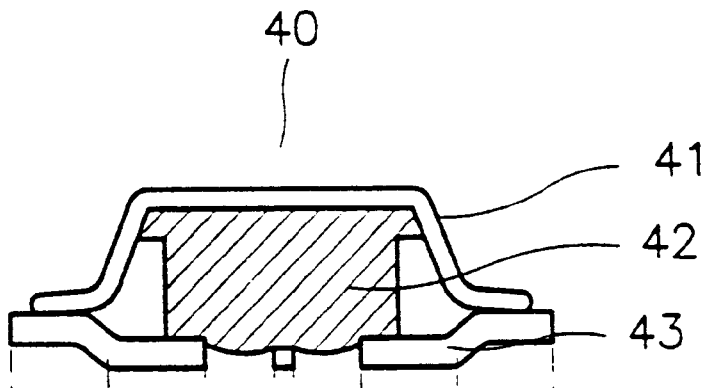
FIGS. 4A and 4B are respectively a vertical cross-sectional view and an end view of a cap assembly of a battery according to an embodiment of the present invention.
Figure 4B:
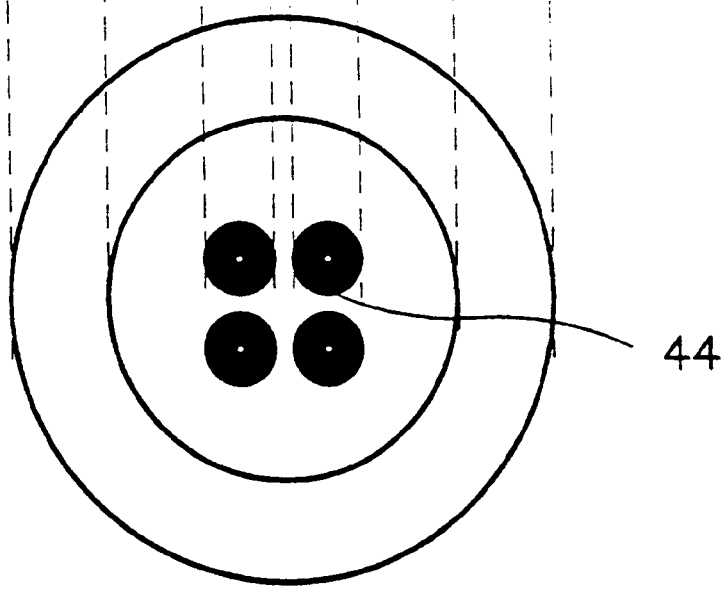

Referring to FIGS. 4A and 4B, a cap assembly 40 is comprised of a cap 41 forming a positive terminal, a cap cover 43 formed under the cap 41 in contact with both ends of the cap 41, and ventilation rubber 42 interposed between the cap 41 and the cap cover 43.

In the cap cover 43, four ventilation holes 44 are formed, the holes 44 being equally spaced from a central point of the cap cover 43.

According to the present invention, at least two ventilation holes 44 formed in the cap cover 43 disperse pressure in all directions to thereby maintain the restoring force of the ventilation rubber 42 as compared with the conventional cap cover having one ventilation hole. It is preferable that the diameter of each ventilation hole be 2 mm or less. Accordingly, it is also preferable that there be at most four ventilation holes, such that the diameter of each ventilation hole is not too small.

Hereinafter, in the subsequent example and comparative example, the effect of the present invention will be described in more detail. However, the invention is not limited to the example to be described.

EXAMPLE 100 batteries employing a cap assembly including a cap cover having four ventilation holes were manufactured. Each of the 100 batteries was repeatedly charged and discharged until the ventilation rubber began to harden. The number of charging and discharging cycles conducted for each battery was recorded. As a result, the average obtained for 100 batteries was 800.

COMPARATIVE EXAMPLE 100 batteries employing the cap assembly shown in FIGS. 3A and 3B including a cap cover having one ventilation hole were used to conduct charge/discharge experiment according to the same method as in the above example. The average number of charging and discharging cycles was approximately 500.

In the above result, the life span of the battery having the cap assembly according to the example was longer than that of the conventional art.

According to the cap assembly of the battery of the present invention, the pressure applied to the ventilation rubber is dispersed to maintain the restoring force of the ventilation rubber. Accordingly, the life span of a battery employing the above cap assembly is enhanced compared to that of a battery having a conventional cap assembly.

What is claimed is:

1. A cap assembly of a battery comprising:
   a cap cover having two ventilation holes formed in a center portion thereof, a cap assembled on an upper edge of the cap cover, and ventilation rubber interposed between the cap cover and the cap for opening and closing the ventilation holes.

2. A cap assembly as claimed in claim 1, wherein each ventilation hole has a diameter of 2 mm or less.

3. A cap assembly as claimed in claim 1, including three to ventilation holes formed in the center portion of the cap cover.

4. A cap assembly as claimed in claim 1, including four ventilation holes formed in the center portion of the cap cover.

5. A cap assembly as claimed in claim 1, including at most four ventilation holes formed in the center portion of the cap cover.

6. A cap assembly as claimed in claim 5, wherein each ventilation hole has a diameter of 2 mm or less.

7. A cap assembly as claimed in claim 5, wherein the ventilation holes are equidistant from a center of the cap cover.

8. A cap assembly as claimed in claim 1, wherein the ventilation rubber is sufficiently large to simultaneously close all of the ventilation holes.

* * * * *